United States Patent [19]

Davis et al.

[11] 4,347,492
[45] Aug. 31, 1982

[54] VARIABLE INDUCTANCE TRANSDUCERS

[75] Inventors: John M. Davis, Loxwood; Barrie C. Burton, Stockton, both of England

[73] Assignee: System E Controls Ltd., Leamington Spa, England

[21] Appl. No.: 214,769

[22] Filed: Dec. 9, 1980

[30] Foreign Application Priority Data

Dec. 15, 1979 [GB] United Kingdom ................ 7943280

[51] Int. Cl.³ .......................................... H01F 21/06
[52] U.S. Cl. .................... 336/136; 33/172 E
[58] Field of Search .................... 336/30, 136, 130; 33/174 L, 172 E, 23 K, 147 R

[56] References Cited

U.S. PATENT DOCUMENTS

| 2,313,989 | 3/1943 | Caldwell et al. | 336/136 X |
| 2,417,097 | 3/1947 | Warshaw | 336/30 |
| 2,833,046 | 5/1958 | Jeglum | 336/136 X |
| 3,553,726 | 1/1971 | Zimmerman | 336/30 |

Primary Examiner—Thomas J. Kozma
Attorney, Agent, or Firm—Scrivener, Clark, Scrivener & Johnson

[57] ABSTRACT

A variable inductance transducer for use in engineering metrology comprises a plunger with a tip and carried in a housing in linear bearings with a core mounted on the plunger within the overall axial length of the bearings, so as to produce an axially compact structure. The bearings can be two separate ball bushings with the core disposed between them.

1 Claim, 2 Drawing Figures

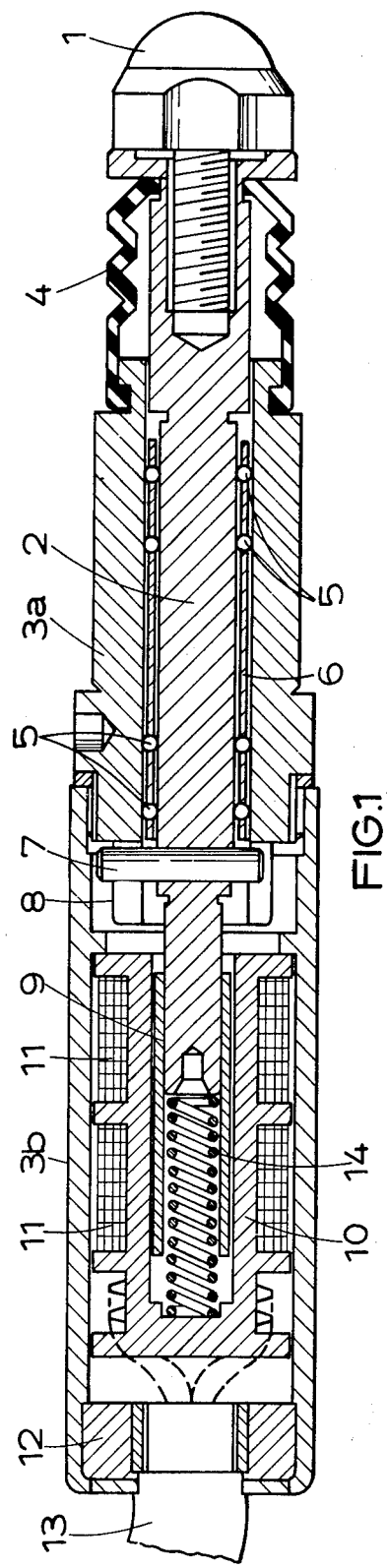
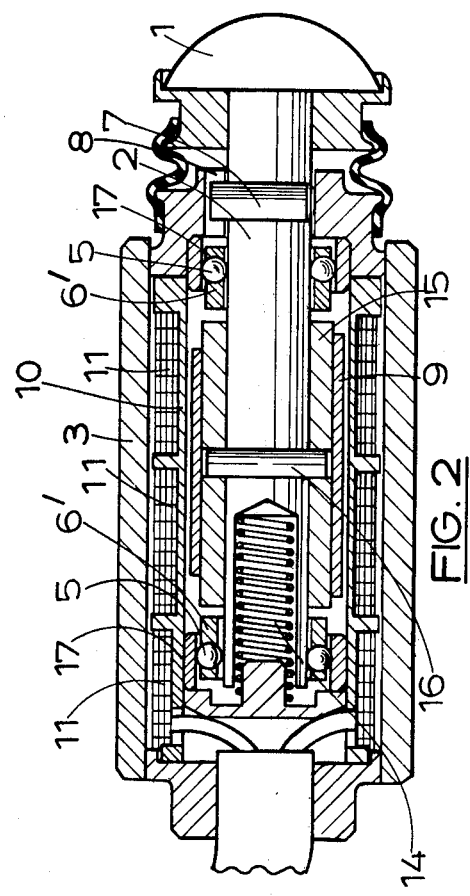

VARIABLE INDUCTANCE TRANSDUCERS

SPECIFIC DESCRIPTION

This invention relates to variable inductance transducers of the kind used for detecting small linear displacements and comprising a housing supporting a coil in which there is a movable core connected to a probe head.

Such transducers are used in engineering metrology, for example for detecting and measuring very small movements of tool slides in machine tools, or for measuring the dimensions of the workpiece that is being machined or ground. The movements to be detected are of the order of microns.

The typical normal transducer of this kind is a cylindrical body 8 mm or 10 mm in diameter and between 35 and 70 mm long. It comprises the following major components:
1. A hardened tip to engage the surface to be measured
2. A lengthwise sliding plunger carrying that tip
3. A dirt shield, usually rubber or plastics bellows
4. A longitudinal sliding bearing, typically a ball bushing, to locate and guide the plunger with minimum friction, long life and, freedom from lateral play
5. A pin and slot or equivalent device to prevent rotation of the longitudinally moving parts
6. A soft iron (or similar) core attached to the plunger
7. Stationary coils enclosing the core.
8. A ferromagnetic cylindrical housing for supporting the above components and forming a mounting.
9. A flexible multi-core cable that needs to be securely anchored to the housing.

Because the moving components, normally the tip plunger, ball bushing, and core are arranged in series it is difficult to reduce the overall length of the transducer below about 30 mm. This imposes a severe restraint on its use, and prevents it being used in many situations where space is restricted. Users are sometimes forced to resort to the introduction of displacement-transmitting two-armed or bell-crank levers, with the obvious danger of errors being introduced.

The aim of the present invention is to provide a transducer layout that is more compact, and can therefor be made of smaller overall length than was hitherto found possible.

According to the invention this is achieved by arranging the core within the axial length of the guide bearings that support the plunger. The coil is, of course, outside the core and therefor likewise within, or substantially within, the axial length of the bearing. Preferably the bearing is, as in known transducers, a ball bushing, and in that case it is necessary either for the cage of the bushing to have one or more elongated openings to provide clearance for radial pins connecting the plunger to the core or for the bushing to be split into two axially spaced portions.

The invention will now be further described by way of example with reference to the accompanying drawings, in which:

FIG. 1 is a longitudinal section through a typical known form of linear displacement transducer; and FIG. 2 is a corresponding section through a transducer according to the invention, the same reference numerals being used where applicable.

Referring first to FIG. 1, a hardened tip 1 is secured into the leading end of a non-magnetic plunger 2 which protrudes from the front end of the front part 3a of a two-part cylindrical body. The protruding end of the plunger is protected from dirt by bellows 4. The plunger is guided in the body part by a linear ball bearing or 'ball bushing' formed by two axially spaced pairs of rings of balls 5 located in a cage 6. A diametrically extending pin 7 engages a slot 8 in the tail of the body part 3a to prevent rotation of the plunger.

The plunger 2 extends rearwards of the body part 3a and its tail end carries a hollow core 9 of ferromagnetic material moving within a bobbin 10 that carries a coil 11 in two axially spaced sections. The coil is received in a rear part 3b of the body, screwed to the front part 3a, and at the rear end of the part 3b, there is a bush 12 to receive the cable 13 carrying the leads to the coil 11. A spring 14 urges the plunger to the right.

It will be seen that the overall length of the structure described is substantial. Turning now to FIG. 2, which shows the construction according to the invention, we see, as before, a tip 1 carried on a plunger 2 in a bearing formed by axially spaced rings of balls 5 in separate axially spaced cages 6'. However the hollow cylindrical ferromagnetic core 9 is now mounted around the plunger 2 axially between the two rings of balls 5 of the bearing.

The core is in fact mounted on a sleeve 15 which itself fits over the plunger 2 and is located by a transverse pin 16. The balls 5 run directly on the outside of the plunger 2 and in hardened inserts 17 in the housing.

The bobbin 10 carrying the coil 11 is now likewise substantially within the axial confines of the bearing, and the main cylindrical part of the body 3 is now in one piece. Thus we have been able to reduce substantially the overall length of the transducer without increasing its diameter appreciably and furthermore without detracting from its freedom of movement and accuracy, since the effective length of the bearing supporting the plunger is undiminished. The length is further kept down by moving the pin and slot connection 7 and 8 to the front of the plunger, within the space already available inside the dirt shield 4.

We claim:

1. In a variable inductance transducer comprising; a cylindrical housing; an elongate cylindrical plunger formed in one piece and mounted within said housing coaxially therewith for movement in the direction of the length of said plunger, an end portion of said plunger projecting from one end of said housing, a sensing tip on said projecting end portion, means preventing rotation of said plunger within said housing about the axis thereof; a hollow elongate cylindrical bobbin mounted rigidly within said housing coaxial with said housing and said plunger and having first and second ends, a multi-turn electrical coil wound on said bobbin; a hollow tubular magnetic core, said core being mounted on and secured to said plunger and disposed for movement, with said plunger, within said bobbin, said core being shorter than said bobbin and wholly therewithin, and first and second linear ball bearing means locating said plunger within said housing for said linear movement without lateral play, the improvement wherein said first bearing means comprises a first outer race located in said first end of said bobbin and a ring of circumferentially spaced bearing balls, said balls bearing directly on said first outer race and a portion of said plunger, and said second bearing means comprises a second outer race located in said second end of said bobbin and a second ring of circumferentially spaced bearing balls, said last-mentioned balls bearing directly on a second outer race and a further portion of said plunger axially spaced from said first portion, and said core lying axially wholly between said first and second bearing means.

* * * * *